United States Patent [19]

Jones

[11] 4,282,099

[45] Aug. 4, 1981

[54] INTEGRAL PARTITIONED HEMODIALYSIS UNIT

[76] Inventor: John L. Jones, P.O. Box 233, Pasadena, Calif. 91102

[21] Appl. No.: 98,323

[22] Filed: Dec. 10, 1979

[51] Int. Cl.$^3$ .................. B01D 31/00; B01D 13/00
[52] U.S. Cl. .................. 210/247; 210/321.3; 210/456
[58] Field of Search ............ 210/321 B, 323 R, 456, 210/433 M, 22 A, 247

[56] References Cited

U.S. PATENT DOCUMENTS

| | | | |
|---|---|---|---|
| 3,362,540 | 1/1968 | Bluemle, Jr. | 210/321 B |
| 3,490,523 | 1/1970 | Esmond | 23/258.5 |
| 3,660,280 | 5/1972 | Rogers | 210/22 |
| 3,900,398 | 8/1975 | Gillette | 210/433 M X |
| 4,125,468 | 11/1978 | Juh et al. | 210/456 X |
| 4,173,537 | 11/1979 | Newhart | 210/323 R X |

*Primary Examiner*—Frank A. Spear, Jr.

*Attorney, Agent, or Firm*—J. L. Jones, Sr.

[57] ABSTRACT

A hemodialysis unit has an integral partition disposed across the length and width of the interior of the dialysate chamber separating the dialysate chamber into two subchambers. The first of the two dialysate subchambers has a blood perfusion unit floor and the second dialysate subchamber has a blood perfusion unit ceiling respectively, both subchambers having the opposed exterior length and width margins of the blood perfusion unit sealed to the opposed bonding edges of the dialysate chamber. The cross sectional areas of the two dialysate subchambers so formed are adaptively sized to provide a high velocity flow of dialysate solution over the length of the two subchambers, providing a more rapid sweep of the diffusional boundary layer from the exterior of the two opposed faces of the blood perfusion unit, providing a high rate of removal of waste excreta products from a patient's blood.

6 Claims, 5 Drawing Figures

U.S. Patent  Aug. 4, 1981  4,282,099
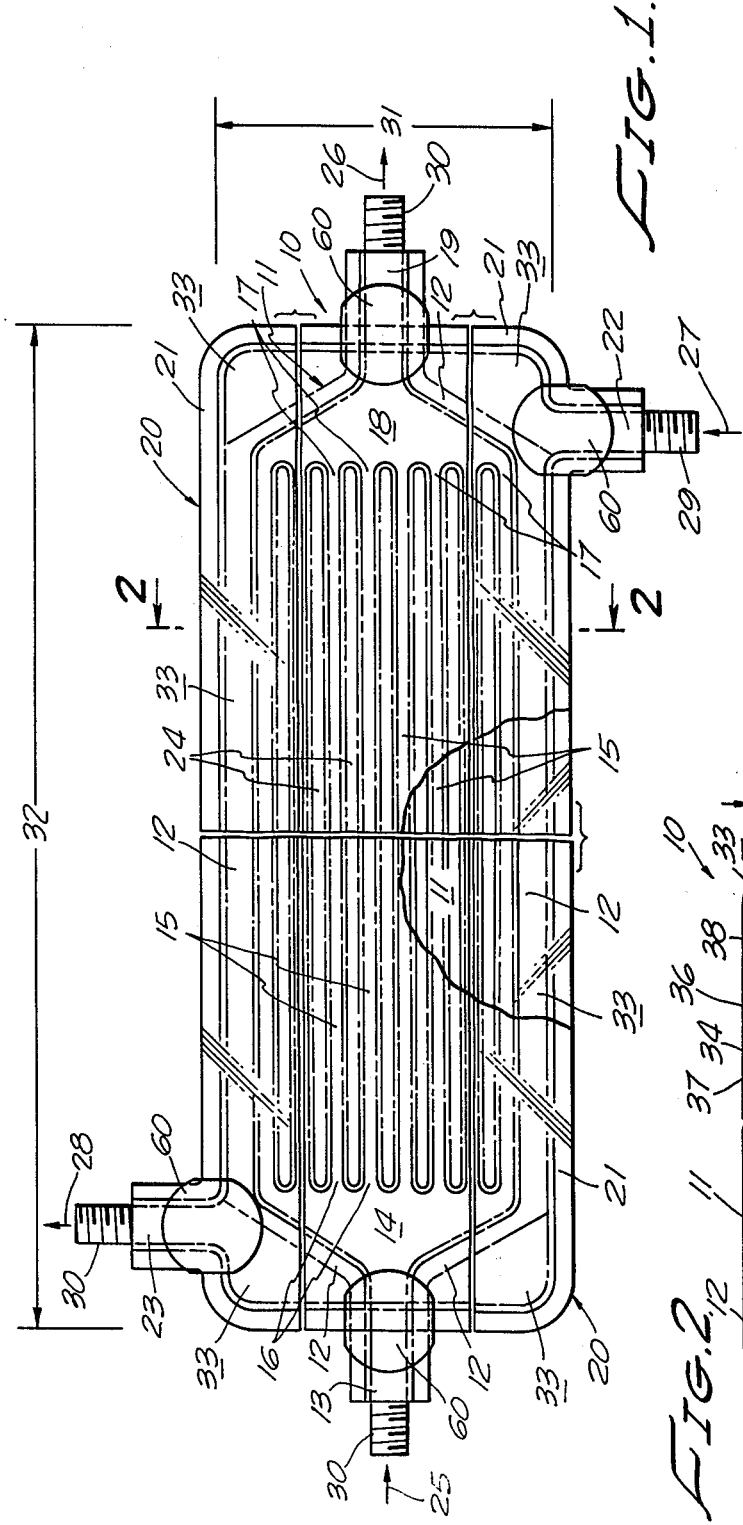
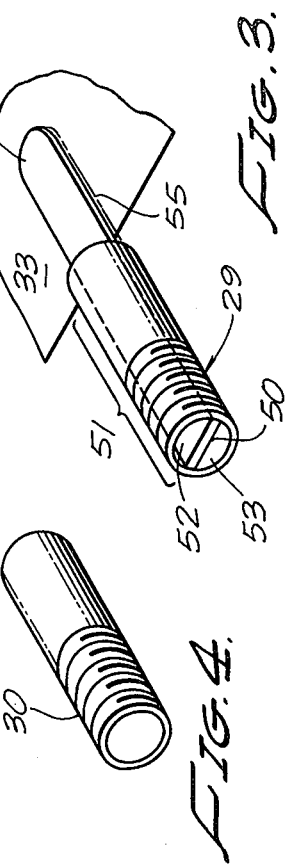
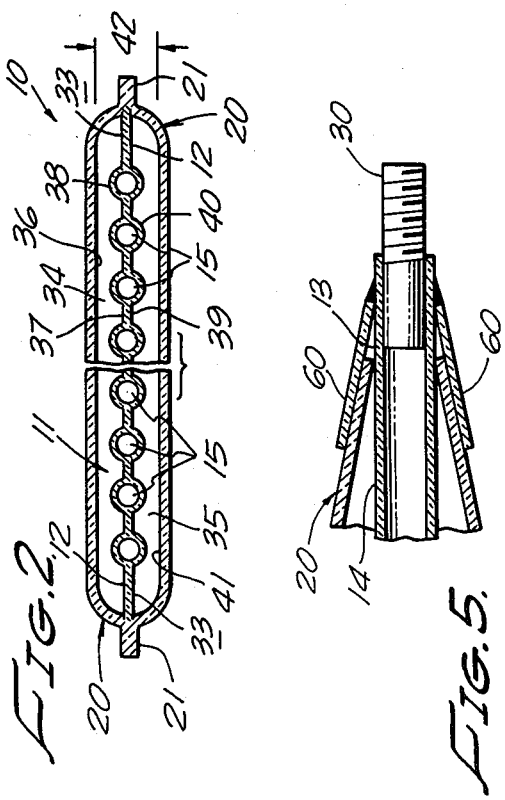

INTEGRAL PARTITIONED HEMODIALYSIS UNIT

CROSS REFERENCE TO RELATED APPLICATIONS

This application is related to the following patent applications on file in the United States Patent and Trademark Office:
- U.S. Pat. No. 4,173,537 for Integral Artificial Kidney Unit by Earle E. Newhart, deceased, inventor;
- U.S. divisional application, Ser. No. 050,510, for Blood Perfusion Unit by Earl E. Newhart, deceased, inventor, divided from the above U.S. patent;
- U.S. patent application, Ser. No. 098,321, for Manufacturing Blood Perfusion Units by J. L. Jones, Sr., inventor, a companion patent application to Ser. No. 050,511, and filed the same date as the present application; and,
- U.S. patent application Ser. No. 098,322, for Hemodialysis Unit Manufacture by J. L. Jones, Sr., inventor, a companion patent application to Ser. No. 098,321 and filed the same date as the present application.

BACKGROUND OF THE INVENTION

This invention is classified in Class 210, Subclasses 22, 321.

The manufacture of blood perfusion units suitable for fabrication into the hemodialysis unit assembly of this invention is disclosed in the Ser. No. 098,322, filed as of this application filing date by this inventor, J. L. Jones, Sr. The modified Newhart blood perfusion unit having a long and relatively narrow width blood perfusion unit configuration, disclosed in the application Ser. No. 098,322, may require disposition in a means providing for the multiple pleated folding of one or more blood perfusion units into a series of folds which provide a perfusion unit free of kinks and twists, providing free unobstructed flow of the patient blood.

Esmond, in U.S. Pat. No. 3,490,523, issued Jan. 20, 1970, disclosed a transfer device having a pair of dialysate flow sheets which open toward the face of a simple blood perfusion envelope. Each one of the pair of flow sheets is secured to an envelope exterior face.

Rogers, in U.S. Pat. No. 3,660,280, issued May 2, 1972, discloses a blood perfusion single flat tube having a flat flexible lattice of fibers of nylon, polypropylene and the like affixed to the exterior of the two faces of the flat tube. The fibers are disposed in a regular rhomboidal pattern on the exterior two faces of the flat blood perfusion tube, which can be wound on a hollow spool or roll.

Both Esmond and Rogers teach advances in controlling the flow of dialysate solution, providing more effective dialysis treatment.

The subject invention has dialysate solution fluid flow means providing a high velocity dialysate solution scrubbing the boundary layer, which controls the rate of diffusion of waste excreta products through the permeable membrane of the blood perfusion unit.

SUMMARY OF THIS INVENTION

The hemodialysis unit has an integral partition disposed and sealed across the length and width of the unit. The blood perfusion unit taught, disclosed and claimed in U.S. Pat. No. 4,173,537, U.S. Ser. No. 050,510 by Earl E. Newhart, deceased, can be modified to provide a relatively wide membrane exterior margin. The membrane exterior margin of the blood perfusion unit is adaptively sized and interiorly sealed into the dialysate solution chamber, bonded and positioned to provide two separate dialysate subchambers. A first dialysate subchamber has a first exterior face of the blood perfusion unit providing a first subchamber floor. A second dialysate subchamber has a second exterior face of the blood perfusion unit providing a second subchamber ceiling. The cross section area of the sum of the two subchambers has width/height ratios of at least 10/1 and greater. The two dialysate subchambers, provided by the bonding of the membrane exterior margin of the blood perfusion unit of the dialysate chamber, extend the full length and width of the dialysate chamber. A dialysate solution flow splitter input nozzle is secured to the membrane exterior margin of the interior of the dialysate input port, providing equal volume dialysate solution flow into the two subchambers. An output nozzle is secured in the dialysate chamber output port, providing an exit for dialysate solution for the two subchambers. The hemodialysis unit can be formed into a coil, or folded in pleat folds.

Included in the objects of this invention are:

To provide a dialysis solution chamber partition into two separate subchambers.

To provide two separate dialysis subchambers, each having a cross sectional area adaptively sized to provide a relatively high velocity of dialysate solution flow over the two opposed exterior faces of a blood perfusion unit disposed in the dialysate chamber.

To provide a hemodialysis unit construction wherein the membrane margin of a blood perfusion unit is secured and bonded to the enclosing dialysate chamber, providing two opposed dialysate subchambers divided by said blood perfusion unit.

Other objects and advantages of this invention are taught in the following description and claims.

BRIEF DESCRIPTION OF THE DRAWINGS

The description of this invention is to be read in conjunction with the following drawings:

FIG. 1 is a plan partial sectional view of the hemodialysis unit of this invention having an integrally partitioned dialysate chamber provided by bonding the membrane exterior margins of the blood perfusion unit to the dialysate chamber.

FIG. 2 is a sectional view though 2—2 of FIG. 1, illustrating the blood perfusion unit bonded at its membrane exterior margins to the dialysate chamber across the chamber width, providing two dialysate subchambers.

FIG. 3 illustrates dialysate solution flow splitter input nozzle secured to a membrane exterior margin.

FIG. 4 illustrates a fluid flow nozzle.

FIG. 5 illustrates the insertion and securing of a fluid flow nozzle, such as a blood inlet port and an outlet port.

DESCRIPTION OF THE PREFERRED EMBODIMENT OF THE INVENTION

Referring now to FIG. 1, the new dialysis unit 10 has a blood perfusion unit 11 as taught, disclosed and claimed in allowed U.S. Pat. No. 4,173,537 and copending U.S. Ser. No. 050,510, by Earle E. Newhart, deceased. The bonded edge 12 disposed and sealed around the edge of the perfusion unit 11, provides unit 11 containment for the patient's blood undergoing hemodialysis. The blood inlet port 13 provides an inlet for patient arterial blood into the blood inlet manifold 14, and a threaded nozzle insert 30 secured in the outlet port 19 provides a means of simply and securely connecting the unit 10 to the patient's vein. Each one of the parallel blood tubules 15 are separated by co-parallel bonded flat joints 24 which seal the pair of membranes together. The incoming blood termini 16 of tubules 15 empty into outgoing blood termini 17 of tubules 15, which in turn are interconnected to the blood outlet manifold 18. The manifold 18 interconnects to the blood outlet port 19 which has a threaded blood nozzle insert 30 disposed and secured therein.

The dialysate solution chamber 20 interiorily encloses the blood perfusion unit 11 and the two, chamber 20 and unit 11, are sealed and bonded together across the width 31 and length 32 of both. The blood perfusion unit 11 of U.S. Pat. No. 4,173,501 and U.S. Ser. No. 050,510 are modified and adaptively sized to provide an enlarged membrane exterior margin 33, which is exterior to the bonded edge 12 of the perfusion unit 11. The membrane exterior margin 33 is adaptively sized to be bonded and sealed to the bonded edge 21 of the dialysate chamber 20, as illustrated in FIG. 2.

The sealing of membrane margin 33 across the internal width 31 and length 32 of unit 10 provides two dialysate subchambers, a first subchamber 34 and a second subchamber 35, as shown in FIG. 2. The subchamber 34 has a ceiling 36 formed by chamber 20, and a floor 37 formed by the first exterior face 38 of the blood perfusion unit 11. The subchamber 35 has a ceiling 39 formed by the second exterior face 40 of perfusion unit 11, and a floor 41 formed by the chamber 20. The internal width 31 of the dialysate chamber and the internal height 42 of the chamber are the required values necessary to produce a high value of flow velocity of dialysate solution, flowing at a typical flow rate of 500 ml/min or thereabouts. The ratio (width 31)/(height 42) can be at least 10/1, and greater. The blood perfusion unit 11 is disposed substantially midway the height 42, providing two subchambers 34 & 35 of substantially equal heights.

The chamber 20 and the blood perfusion unit 11 are formed of transparent plastics which can be chemically compatible on heat sealing, or the sealing can be accomplished by a compatible adhesive bonding, as is well known. The dialysate chamber 20 has a wall thickness physically compatible with a requirement for an approximate 100 mm Hg negative pressure on the dialysate solution, or thereabouts, as is used in many hemodialysis procedures. A transparent chamber 20 enables one to inspect the patient's blood flow.

Referring now to FIG. 3, the nozzle threaded insert 29 is shown having a septum 50 extending the length 51 of the nozzle 29, the septum 50 diametrically disposed in the nozzle insert 29. The two half nozzle cylinders 52 and 53 deliver equal volume of dialysate solution to the first and second subchambers 34 and 35, which are formed by the membrane exterior margin 33. The pair of spring clip extensions 54 and 55 are extensions of the septum 50, which can be secured over and under the margin 33, and secured in position by spring tension or adhesive bonding.

FIG. 4 illustrates a second simple threaded nozzle insert 30. The nozzle insert 30 and insert 29 can be adaptively sized and sealed into the blood inlet and outlet ports 13 and 19 and the dialysate inlet and outlet ports 22 and 23, as needed. All the nozzle inserts 29 and 30 can be sealed or adhesively bonded into their respective ports by heat sealing a plastic nozzle to the chemically compatible port or by adhesive bonding, as is well known and illustrated in FIG. 5. The tubular seal 60 is heat sealed or adhesively bonded to all the ports 13, 19, 22 and 23 as a strength reinforcement and fluid seal, as required. The threaded nozzle inserts 29 and 30 can be threaded for convenience and safety in attaching the necessary tubes in service.

The integral partitioned hemodialyses unit can have a dialysate solution flow rate of typically 500 ml/min, providing a high velocity flow of dialysate solution over the length of the two subchambers. This high flow provides a high velocity sweep of the diffusional boundary layer from the two opposed exterior face of the blood perfusion unit and provides a high rate of removal of waste excreta products from patient's blood.

The integral partitioned hemodialysis unit 10 can be sufficiently flexible to coil the unit 10 into a well known and convenient size coil, the coil being wound on a spool or open core having a core cylindrical symmetry axis parallel to the width 31 of unit 10. The unit 10 can also be folded into a pleat fold unit having multiple pleat folds.

Many modifications in the integral partitioned hemodialysis unit can be made in the light of my teachings. It is understood that within the scope of the claims, the invention can be practiced otherwise than as described.

I claim:

1. In a hemodialysis unit comprising a dialysis chamber having inlet and outlet dialysate ports and a pair of opposed sealed membrane sheets forming an integral blood perfusion unit having integral blood inlet and outlet ports, inlet and outlet blood manifolds, and multiple blood tubules disposed in parallel between said inlet and outlet manifolds, said integral blood perfusion unit having a length parallel to said parallel blood tubules, a width normal to said blood tubules, said membrane having high permeability to waste excreta products of patients, said blood perfusion unit disposed in the interior of said dialysis chamber, the combination comprising:

the membrane exterior margins of said blood perfusion unit adaptively sized and interiorly secured at all said membrane exterior margins to the bonded edge of said dialysate chamber, said membrane exterior margins bonded and positioned to provide two separate dialysate subchambers, a first dialysate subchamber having a first exterior face of said blood perfusion unit providing a first subchamber floor, and a second dialysate subchamber having a second exterior opposed face of said blood perfusion unit providing a second subchamber ceiling, said two dialysate subchambers having the cross sectional areas of said two subchambers adaptively sized and adaptively positioned to provide a high velocity flow of dialysate solution over the length of said two subchambers, providing a rapid sweep of the diffusional boundary layer from the two opposed exterior face of the blood perfusion unit and providing a high rate of removal of waste excreta products from patient's blood.

2. In the hemodialysis unit set forth in claim 1, the further modification wherein, said two dialysate subchambers have a (cross sectional area width/combined height) ratio of at least 10/1 and greater.

3. In the hemodialysis unit set forth in claim 1, the further modification wherein, said two dialysate subchambers have a first single nozzle means having a septum providing a dialysate solution flow split input and a second single nozzle means providing dialysate solution output, the cross sectional areas of said two subchambers adaptively sized and said input and output solution single nozzles adaptively sized and positioned to provide a high velocity flow of dialysate solution over the length of each of said two subchambers, providing a high velocity sweep of the diffusional boundary layer from the two opposed exterior faces of the blood perfusion unit and providing a high rate of removal of waste excreta products from patient's blood.

4. In the hemodialysis unit set forth in claim 1, the further modification wherein, said two dialysate subchambers having one dialysate solution flow splitter input single nozzle secured at the septum extension of said input nozzle to said membrane exterior margin, and a solution output single nozzle, said input and output solution single nozzles adaptively sized and positioned to provide a high velocity equal volume flow of dialysate solution over the length of said two subchambers.

5. In a hemodialysis unit comprising a dialysis chamber having inlet and outlet dialysate ports and a pair of opposed sealed membrane sheets forming an integral blood perfusion unit having integral blood inlet and outlet ports, inlet and outlet blood manifolds, and multiple blood tubules disposed in parallel between said inlet and outlet manifolds, said integral blood perfusion unit having a length parallel to said parallel blood tubules, a width normal to said blood tubules, said membrane having high permeability to waste excreta products of patients, said blood perfusion unit disposed in the interior of said dialysis chamber, the combination comprising:

said membrane exterior margins of said blood perfusion unit adaptively sized and interiorily secured at all said membrane exterior margins to the bonded edge of said dialysate chamber, said membrane exterior margins bonded and positioned to provide two separate dialysate subchambers, a first dialysate subchamber having a first exterior face of said blood perfusion unit providing a first subchamber floor, and a second dialysate subchamber having a second exterior opposed face of said blood perfusion unit providing a second subchamber ceiling, said two dialysate subchambers having one dialysate solution input nozzle having a septum providing a split dialysate solution input and one solution output nozzle, the cross sectional areas of said two subchambers adaptively sized and said input and output solution nozzles adaptively positioned to provide a high velocity flow of dialysate solution over the length of said two subchambers, providing a high velocity sweep of the diffusional boundary layer from the two opposed exterior faces of the blood perfusion unit and providing a high rate of removal of waste excreta products from patient's blood.

6. In a hemodialysis unit comprising a dialysis chamber having inlet and outlet dialysate ports and a pair of opposed sealed membrane sheets forming an integral blood perfusion unit having integral blood inlet and outlet ports, inlet and outlet blood manifolds, and multiple blood tubules disposed in parallel between said inlet and outlet manifolds, said integral blood perfusion unit having a length parallel to said parallel blood tubules, a width normal to said blood tubules, said membrane having high permeability to waste excreta products of patients, said blood perfusion unit disposed in the interior of said dialysis chamber, the combination comprising:

said membrane exterior margins of said blood perfusion unit adaptively sized and interiorily secured at all said membrane exterior margins to the bonded edge of said dialysate chamber, said membrane exterior margins bonded and positioned to provide two separate dialysate subchambers, a first dialysate subchamber having a first exterior face of said blood perfusion unit providing a first subchamber floor, and a second dialysate subchamber having a second exterior opposed face of said blood perfusion unit providing a second subchamber ceiling, said two dialysate subchambers having the cross sectional areas of said two subchambers adaptively sized and adaptively positioned to provide a high velocity flow of dialysate solution over the length of said two subchambers, and, said two dialysate subchambers having one dialysate solution input nozzle having a septum providing a split dialysate solution input, and one solution output nozzle, said input and output solution nozzles adaptively positioned to provide a high velocity flow of dialysate solution over the length of said two subchambers, providing a high velocity sweep of the diffusional boundary layer from the two opposed exterior faces of the blood perfusion unit and providing a high rate of removal of waste excreta products from patient's blood.

* * * * *